Figure 1:
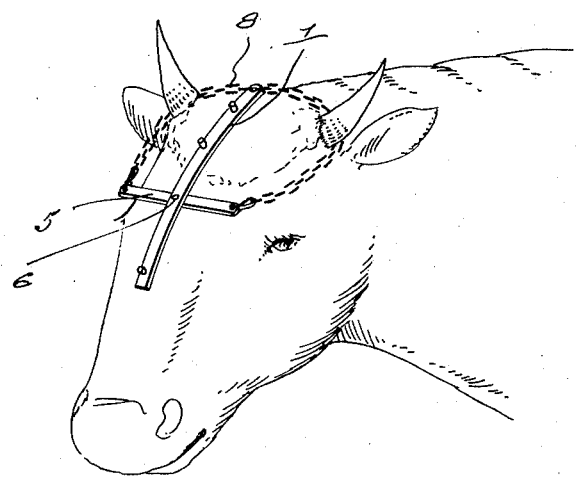

Jan. 21, 1930.　　　I. M. BERGSTEN　　　1,744,034
PROTECTOR FOR LIVE STOCK
Filed March 13, 1928

Inventor
I. M. Bergsten

By Clarence A. O'Brien
Attorney

Patented Jan. 21, 1930

1,744,034

UNITED STATES PATENT OFFICE

IVIL M. BERGSTEN, OF CHAMPION, NEBRASKA

PROTECTOR FOR LIVESTOCK

Application filed March 13, 1928. Serial No. 261,282.

This invention relates to improvements in devices for protecting live stock from injury caused by fighting between horned animals, or for protection in instances where live stock, such as bulls, in angry mood, attack fences or other firm objects with their horns, obviously resulting in injury to the animal's head.

The main object of this invention is to provide a device which may be readily disposed upon the animal's head in the manner whereby the same will not become accidentally displaced, and which will protect the animal's head when engaged in attacking some firm object, but which will discourage the animal when encountered by another animal wearing one of these novel devices.

Another object resides in providing this device with means intended to punish the opposing animals and to discourage them, without inflincting any serious injury.

Still another object resides in the fact that this device may be folded and packed within a carton of small compass, thus reducing the cost of shipment materially.

Other very novel objects and advantages of the present device will become apparent as the same is better understood from the specification and claim to follow.

In the drawings:—

Figure 2:
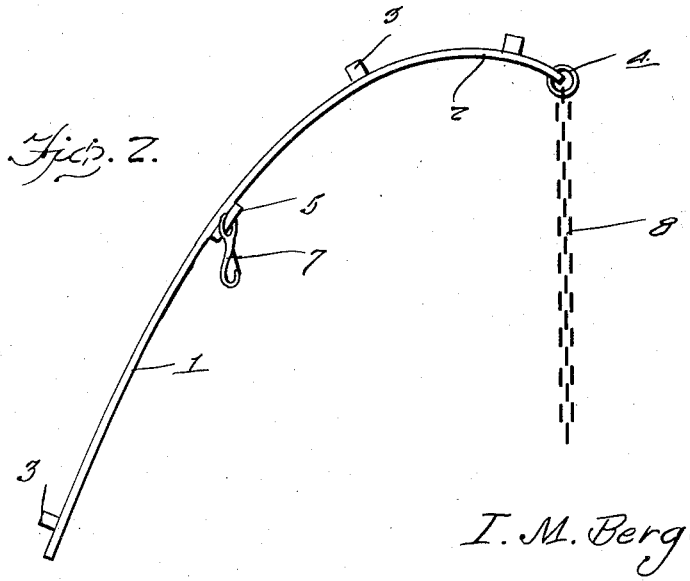

Figure 1 represents the device in perspective view and mounted in proper position upon the head and forehead of an animal, and Fig. 2 represents a longitudinal edge elevation of the device.

Now for a more detail description of this invention, reference is made to the drawing wherein like numerals designate like parts. This novel protector includes a relatively elongated strip 1 of substantially heavy metal. The major portion of this strip extending toward its lower extermity is of slight arcuate shape, while its upper end portion is of increased curvature in conformity with the back of the animal's head.

The major portion of this strip, being of slight curvature is adapted to engage the forehead, and a substantial portion of the animal's nasal. Projecting elements 3 are arranged on the outer surface of the strip at intervals found most suitable for various types of animals. The upper end of this strip is formed with an opening thru which a ring 4 is loosely fixed.

A cross strip 5 of substantially shorter length than the strip 1, has its intermediate portion secured to the intermediate portion of the strip 1 by a rivet 6, which rivet is adapted to snugly secure the strips together, but which will allow the shorter strip to be swung inwardly in alinement with the strip 1, for the purpose of shipment.

Each end of the shorter strip is formed with an opening in which a snap hook 7 is connected. A chain 8 has one of its intermediate links connected with the ring 4 of the elongated strip, while its end links may be adjustably associated with the shorter strip 5, by the engagement of the respective snap hooks 7 in the respective end links of the chain, so as to tighten the latter snugly about the horn of the animal to prevent the displacement of the strip.

When ill-tempered animals such for instance as bulls meet in combat, each wearing one of these novel protectors, it will be found that they will become easily discouraged by the pricking of the projecting members 3 in their hides, which punishment will not be serious, and does not detract from the animal's appearance.

Having thus described my invention, what I claim as new is:—

In a protector for animals of the character described, an elongated strip, projections on the outer surface of said strip, a ring at the upper end of said strip, a cross strip secured to said elongated strip at its intermediate portion, and a flexible strand connected to the said ring at the intermediate portion thereof, while the end portions of said strand are adapted to be secured to the ends of said cross strip.

In testimony whereof I affix my signature.

IVIL M. BERGSTEN.